United States Patent [19]

Burns

[11] Patent Number: 5,069,579

[45] Date of Patent: Dec. 3, 1991

[54] EROSION PREVENTION DEVICE

[76] Inventor: Richard Burns, 230 SW. 64th Ter., Pembroke Pines, Fla. 33023

[21] Appl. No.: 696,297

[22] Filed: Apr. 30, 1991

Related U.S. Application Data

[63] Continuation of Ser. No. 493,701, Mar. 14, 1990, abandoned.

[51] Int. Cl.$^5$ .............................................. E02B 3/04
[52] U.S. Cl. ...................................... 405/25; 405/21; 405/30; 405/35
[58] Field of Search ...................... 405/15, 16, 21–25, 405/29–35

[56] References Cited

U.S. PATENT DOCUMENTS

| | | | |
|---|---|---|---|
| 551,641 | 12/1895 | King | 405/23 |
| 598,076 | 2/1898 | Case | 405/21 |
| 3,096,621 | 7/1963 | Danel | 405/16 |
| 3,323,310 | 6/1967 | Arpin | 405/24 |
| 3,888,209 | 6/1974 | Boots | 405/25 X |
| 3,934,540 | 1/1976 | Bruner et al. | 405/21 X |
| 4,139,319 | 2/1979 | Anderson | 405/16 |
| 4,367,977 | 1/1983 | Schaaf et al. | 405/25 |
| 4,436,447 | 3/1986 | Crowe | 405/16 |
| 4,629,360 | 12/1986 | Cacossa et al. | 405/16 |
| 4,657,432 | 4/1987 | Rentrop et al. | 405/24 |

FOREIGN PATENT DOCUMENTS

| | | | |
|---|---|---|---|
| 0003905 | 1/1982 | Japan | 405/25 |
| 2127469 | 4/1984 | United Kingdom | 405/24 |

*Primary Examiner*—Dennis L. Taylor
*Attorney, Agent, or Firm*—Herbert L. Lerner; Laurence A. Greenberg

[57] ABSTRACT

An erosion prevention device, comprising a concrete block having a top surface and a substantially flat bottom surface, current reduction flaps each having top and bottom portions, the concrete block having openings formed in the top surface for receiving the bottom portions of the current reduction flaps, and means for retaining the bottom portions in the openings.

9 Claims, 2 Drawing Sheets

EROSION PREVENTION DEVICE

This application is a continuation of application Ser. No. 493,701, filed Mar. 14, 1990, now abandoned.

BACKGROUND OF THE INVENTION

1. Field of the Invention

The invention relates to an erosion prevention device for preventing erosion of land due to water currents, in particular for preventing the erosion of sandy beaches on large bodies of water.

2. Description of the Prior Art

Beach erosion has been a particularly grave problem along tourist beaches and other densely populated stretches of coastal areas, where the water slowly eats away at the land and threatens buildings, roads or other man-made structures.

Several possible ways exist to battle coastal erosion, including the construction of seawalls, the buildup of artificial breaker reefs or other means for decreasing the force of underwater currents.

While seawalls cannot be used to battle the erosion of sandy beaches, the option to create artificial reefs is very often too costly and it poses a threat to the shipping industry.

A less costly and even rather inexpensive option is to provide devices to reinforce the surface which is in danger of being eroded. Several such devices have been suggested, for instance those disclosed in U.S. Pat. Nos. 4,629,360 to Cacossa et al, 3,096,621 to Danel, 4,436,447 to Crowe, and 4,139,319 to Anderson.

Those U.S. patents relate to concrete blocks, strings of concrete discs, the interlocking of concrete blocks, or the combination of used tires and concrete to form concrete blocks.

Since concrete structures which are not provided for underwater use would be rather disturbing on beaches used for recreational purposes, they can only be utilized in less densely populated coastal areas.

SUMMARY OF THE INVENTION

It is accordingly an object of the invention to provide an erosion prevention device, which overcomes the hereinaforementioned disadvantages of the heretofore-known devices of this general type and which reinforces the coastal surface which is in danger of being eroded, and provides resistance against underwater current and thereby reduces the force of the current and provides a clean and environmentally safe disposal for old rubber tires.

With the foregoing and other objects in view there is provided, in accordance with the invention, an erosion prevention device, comprising a concrete block having a top surface and a substantially flat bottom surface, current reduction flaps each having top and bottom portions, the concrete block having openings formed in the top surface for receiving the bottom portions of the current reduction flaps, and means for retaining the bottom portions in the openings.

In accordance with another feature of the invention, the the flaps are formed of rubber, in particular of sections cut from old motor vehicle tires.

In accordance with a further feature of the invention, the top portions of the flaps are in the form of a plurality of strips attached to the respective bottom portions After a section is cut out from the tire, several further longitudinal cuts are made into the top portion of the flaps. This slightly reduces the current resistance of the flaps, but the individual strips are better able to adapt to the fluctuating underwater current conditions, and therefore are very efficient in collecting sand which would otherwise be washed from the shore.

In accordance with an added feature of the invention, the retaining means are in the form of rods extending through the lower portions of the flaps and at least partly through the concrete block. The rods are pierced through the lower portion of the rubber flaps before the concrete block is poured.

In a most advantageous manufacturing process, a rebar structure or reinforcement bar frame is built, then the current reduction flaps are attached thereto, and then the concrete is poured into the form in which the rebar structure with the flaps is disposed.

In accordance with a concomitant feature of the invention, the concrete block has an oblong rectangular surface and the bottom surface is substantially parallel thereto. By forming oblong rectangular concrete blocks, the erosion prevention device according to the invention can be stacked better.

After a certain period of time, sand will build up around the device according to the invention. At that point, a further erosion prevention block may be set on top of the first one, and effectiveness will again be maximized.

Furthermore, standardized rectangular blocks can be interconnected rather easily. Such connectibility will be required when the device according to the invention is used where underwater currents reach a certain strength. In other words, a number of blocks can be interconnected to increase their stability against underwater forces and thus further improve their effectiveness.

Other features which are considered as characteristic for the invention are set forth in the appended claims.

Although the invention is illustrated and described herein as embodied in an erosion prevention device, it is nevertheless not intended to be limited to the details shown, since various modifications and structural changes may be made therein without departing from the spirit of the invention and within the scope and range of equivalents of the claims.

The construction of the invention, however, together with additional objects and advantages thereof will be best understood from the following description of the specific embodiment when read in connection with the accompanying drawings.

DESCRIPTION OF THE PREFERRED EMBODIMENTS

Figure 1:
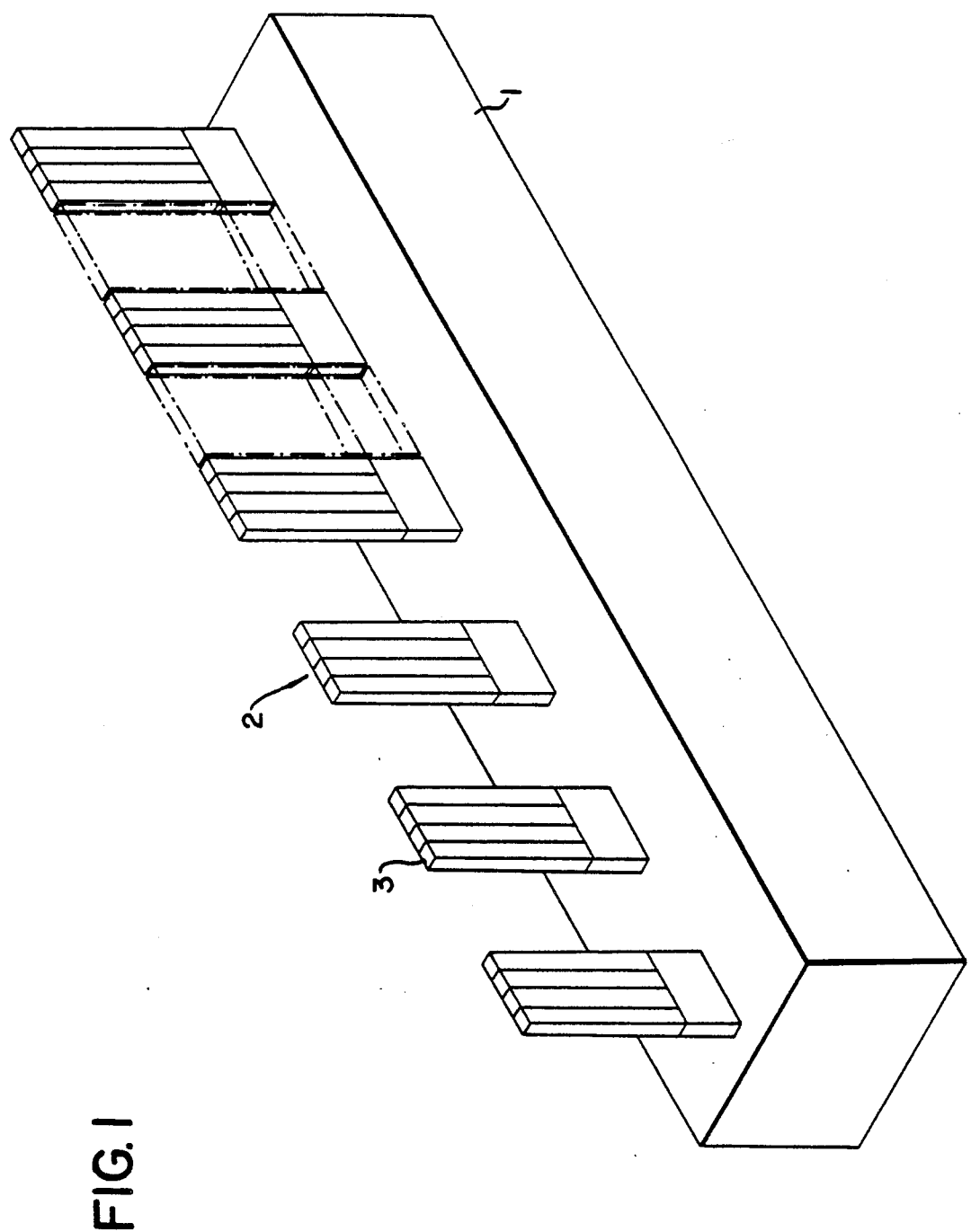
FIG. 1 is a diagrammatic perspective view of the device in accordance with the invention.

Referring now to the figures of the drawing in detail and first, particularly, to FIG. 1 thereof, there is seen a concrete body or block 1. The body 1 includes four substantially equal rectangular side surfaces and two substantially equal end surfaces.

Attached to a top surface of the body 1 are several current reduction flaps 2. The flaps 2 are inserted in equidistantly spaced, non-illustrated recesses in the body 1.

Figure 2:
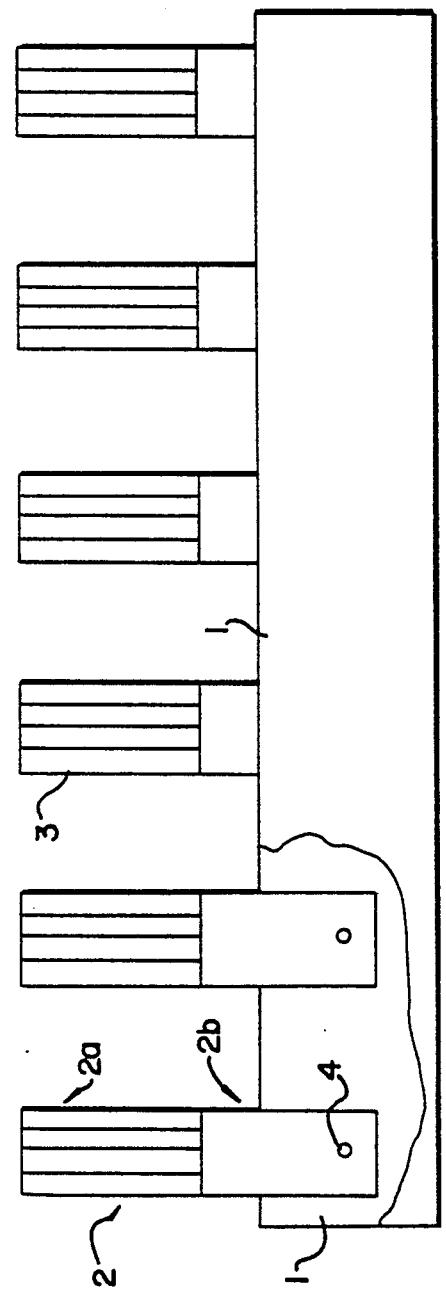
FIG. 2 is a partly broken-away, side-elevational view of the erosion prevention device.
Figure 3:
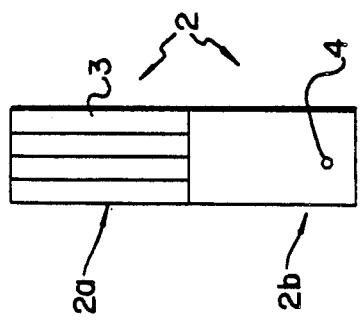
FIG. 3 is a side-elevational view of a current reduction flap.

The illustration of the spaces between the flaps 2 in FIGS. 1 and 2 is largely exaggerated for better clarity. In fact, the flaps 2 may be disposed adjacent each other along the central longitudinal line of the concrete block 1. Two additional flaps 2 are shown in phantom in FIG. 1.

The flaps 2 shown in FIG. 1 are formed of rubber, advantageously cut from old tires. A top portion of the flaps 2 is cut into four strips 3 each. Any number of strips is possible, however. Accordingly, while the top portion may not be cut longitudinally at all, it may be frayed into a large number of thin strips, for instance in the order of 100. When the device in accordance with the invention is placed under water, the elastic rubber flaps 2 will resist and partly break the underwater current. On the other hand, they do not pose a threat to boats, since they will give enough so that boats will not be damaged.

As seen in FIG. 2, the flaps 2 are inserted in the concrete block 1 and held in place by rods. Accordingly, the flaps 2 equipped with an opening for receiving the rods 4 prior to their insertion in the block 1.

The flap 2 includes a top portion 2a and a bottom portion 2b. The bottom portion 2b is partially inserted in the block 1 and held in place by the rod 4.

The top portion 2a is cut into strips 3. Any number of strips may be possible, depending on manufacturing requirements, average strength of current or degree of functionality desired.

The bottom portion 2b of the flap 2 is constructed so that it can receive a rod 4 which, retains the flap 2 in its position.

An advantageous manufacturing process is to first build a rod structure or basic frame to which the flaps 2 are attached. The concrete is then poured around this frame holding the flaps 2.

It is also seen that it would be possible to produce such erosion prevention devices directly on a ship or barge, from which they could be lowered into the water.

I claim:

1. The combination of means for disposing of tires and preventing erosion of land due to water current, comprising
   a concrete block having a top surface and a substantially flat bottom surface, elastic current reduction flaps formed of rubber sections cut from said tires, each having top and bottom portions,
   said bottom portions of said current reduction flaps being embedded in said concrete block and said top portion of said flaps being in the form of a multitude of strips attached to said bottom portions,
   and means for retaining said bottom portions in said concrete blocks,
   said flaps being bendable relative to said concrete block.

2. The device according to claim 1, wherein said retaining means are in the form of rods extending through said lower portions of said flaps and at least partly through said concrete block.

3. The device according to claim 1, wherein said top surface is oblong rectangular and said bottom surface is substantially parallel to said top surface.

4. The device according to claim 1, wherein said flaps are disposed adjacent to each other to form a continuous flap.

5. Method of disposing of old rubber tires and preventing beach erosion, which comprises cutting old rubber tires into rubber strips having top and bottom portions, placing the rubber strips into a container, filling the container with concrete and embedding the bottom portions of the rubber strips in the concrete while forming a concrete structure having a lower surface and a top surface with rubber strips protruding from the top surface, and placing the concrete structure in a body of water in the vicinity of the shore for preventing beach erosion.

6. The method according to claim 5, which comprises disposing a rebar structure in the container and attaching the rubber strips to the rebar structure prior to filling with concrete.

7. Method of disposing of rubber tires and preventing beach erosion, which comprises attaching strips cut from rubber tires to a rebar structure, placing the rebar structure in a container, pouring concrete into the container, curing the concrete in the container for forming a concrete block and fastening the rebar structure in the concrete block with the rubber strips protruding from the top surface thereof, and placing the concrete block in a body of water in the vicinity of the shore for preventing beach erosion.

8. The method according to claim 7, which comprises placing a plurality of concrete blocks in the water for forming a continuous wall of blocks.

9. The method according to claim 5, which comprises placing a plurality of concrete structures in the water for forming a continuous wall of blocks.

* * * * *